(No Model.)  
W. P. GROOM.  
2 Sheets—Sheet 1.

SET OF BLANKS FOR EFFECTING THE INTER TRANSFER OF
OWNERSHIP OF PROPERTY.

No. 336,005.  Patented Feb. 9, 1886.

*Fig. 1.*

*Fig. 2.*

Witnesses:—  
Louis M. J. Whitehead  
Theo. Haynes

Wallace P. Groom  
Inventor:—  
R. G. Dyrenforth  
Attorney (No Model.)

W. P. GROOM.

SET OF BLANKS FOR EFFECTING THE INTER TRANSFER OF
OWNERSHIP OF PROPERTY.

2 Sheets—Sheet 2.

No. 336,005. Patented Feb. 9, 1886.

*Fig. 3.*

No. ............ New York, ............ January 21st 1883.

United States Transfer & Exchange Association
at New York City

Received for entry Jany 21/83, No 111.

Upon the prompt transfer to the undersigned of credit on your books to the amount of ____ Two thousand ____ Dollars, on an order of ____ John Doe & Co ____ transfer to ____ them ____ One hundred ____ Shares of Stock of the ____ Erie ____ Railway Company ____ from ____ our ____ account.

No of Shares ____ 100 ____ $ 2,000 00 ____ Richard Roe & Co.

ORIGINAL

*Fig. 4.*

No. ............ New York, ............ January 21st 1883.

United States Transfer & Exchange Association
at New York City

Received for entry Jany 21/83, No 111.

Upon the prompt transfer to the undersigned of credit on your books to the amount of ____ Two thousand ____ Dollars, on an order of ____ John Doe & Co ____ transfer to ____ them ____ One hundred ____ Shares of Stock of the ____ Erie ____ Railway Company ____ from ____ our ____ account.

No of Shares ____ 100 ____ $ 2,000 00 ____ Richard Roe & Co.

DUPLICATE

Witnesses:-
Louis M. F. Whitehead.
Fred. Haynes.

Wallace P. Groom
Inventor:
R. S. Dyrenforth,
Attorney.

United States Patent Office.

WALLACE P. GROOM, OF BROOKLYN, NEW YORK.

SET OF BLANKS FOR EFFECTING THE INTERTRANSFER OF OWNERSHIP OF PROPERTY.

SPECIFICATION forming part of Letters Patent No. 336,005, dated February 9, 1886.

Application filed June 30, 1884. Serial No. 136,384. (No model.)

*To all whom it may concern:*

Be it known that I, WALLACE P. GROOM, of the city of Brooklyn, in the county of Kings and State of New York, have invented a new and useful Improvement in Sets of Blanks for Effecting the Intertransfer of Ownership of Property, of which the following is a specification.

The object of my invention is to provide blanks for use in accomplishing the intertransfer of property through trustees, by the employment of which the ordinary risks attending commercial and financial transactions between two persons, firms, or corporations shall be avoided by preventing or withholding the correlative instruments ordering transfer from either person, firm, or corporation from taking effect until satisfied by the simultaneous and safe transfer to the ownership of the other person, firm, or corporation of the specified consideration therefor.

The invention is embodied in a set of blanks or orders consisting of an authorization to a trustee from each party to a transfer, each authorization bearing upon its face instructions to transfer from the ownership of the drawer certain property, simultaneously with or upon the transfer to his ownership of certain property of the drawee.

My invention involves the custody by a third party, of the specific property of various kinds—such as money, stocks, bonds, or other property, or evidence thereof—which are owned by persons, firms, or corporations.

In the accompanying drawings, Figures 1 and 2 represent original and duplicate conditional instruments, such as are to be filled out and signed, and which direct a transfer of the ownership of one consideration. Figs. 3 and 4 represent original and duplicate conditional instruments, such as are to be filled out and signed to direct the transfer of the ownership of the consideration which is to satisfy the requirements of the first of said instruments.

These instruments differ very materially from bank-checks ordinarily used in three important particulars—namely, first, these instruments do not order payment, but simply direct the transfer of ownership from one party to the other party to a transaction, and vice versa; second, each instrument specifies both the considerations which are necessary to the transfer; and, third, each instrument has upon it the express condition that it is to be satisfied and to take effect only upon the simultaneous satisfaction of the other instrument.

For the purpose of illustration it may be supposed that two firms, John Doe & Co. and Richard Roe & Co., have property in the custody of the United States Transfer and Exchange Association, the property of John Doe & Co., consisting of a deposit of money, and that of Richard Roe & Co., consisting of shares of Erie Railway Company's stocks. Suppose, for an example, that a sale of one hundred shares of stock for two thousand dollars has been agreed upon by the respective owners of such property. John Doe & Co. give the instrument, Fig. 1, bearing the conditional words, "upon the prompt transfer, on your books, to the ownership of the undersigned of one hundred shares of stock of the Erie Railway Company on an authorization issued by Richard Roe & Co., transfer to their ownership on your books the sum of two thousand dollars from our account." The instrument may also bear the amount of such consideration, specified by numerals, thus—"$2000, No. of shares 100." Richard Roe & Co. execute an instrument, Fig. 3, bearing the words "upon the prompt transfer on your books to the ownership of the undersigned of two thousand dollars on an authorization issued by John Doe & Co., transfer to their ownership one hundred shares of stock of the Erie Railway Company from our account." In lieu of the words "upon the prompt transfer in your books to the ownership of the undersigned," &c., other analogous words may be used, the purpose of such matter being to express clearly the condition that the instrument is not to be satisfied or take effect until both conditions are complied with.

The word "prompt" is here used to designate, generally, such hour as may be from time to time named or fixed by a stock or commercial exchange, or may be established by custom or by the custodian as the time when the transaction must be completed or the instruments returned or refused and protested.

By preference the instruments given by both parties to a transaction are made and signed in duplicate, as here shown, Figs. 2 and 4 representing the duplicates of the instruments shown in Figs. 1 and 3.

From the above it will be understood that the two parties to a transaction are to sign and deliver each to the other, preferably in duplicate, a conditional instrument setting forth both considerations to a transaction, and when one of these instruments with its duplicate is presented at the office of the custodian they are both stamped with the words "received for entry," or other analogous words and with the date, and as received different instruments are numbered consecutively, the original and duplicate bearing the same number, or other means may be used to indicate the time or order of their receipt, as compared with other similar instruments. The duplicate instrument stamped, as above stated, is then detached and returned to the transferee to be retained, if desired, as a perpetual voucher.

As before stated, the instruments are numbered or otherwise marked in the order of their presentation for transfer, and in that order are entered or satisfied, the manner and order of satisfaction of the instrument being governed by the number or other indication stamped upon the instrument for each transaction which may first be received and stamped. For example, the two instruments in the supposed transaction will be controlled by the number 69, although the last received may be 111.

It will be understood from the foregoing description that the transfer of ownership in property is accomplished by my invention with absolute safety to both parties to a transaction and without changing the custody of the property. These results follow from the satisfaction of each instrument being effected only upon the satisfaction of a correlative instrument, and hence each party to a transaction necessarily receives the equivalent consideration agreed upon simultaneously with the transfer of ownership of the specified property. It will also be seen that inasmuch as each conditional instrument specifies both considerations it becomes impracticable, and indeed almost, if not quite, impossible, for any one to raise or in any way privately or wrongfully change the considerations of either of them after signing without prompt detection.

What I claim as my invention, and desire to secure by Letters Patent, is—

A set of blanks or orders for effecting the intertransfer of ownership of property, each order of the set bearing instructions to transfer the ownership in certain specified property of the maker simultaneously with or upon acquiring the ownership of property to be received in exchange therefor.

WALLACE P. GROOM.

Witnesses:
FREDK. HAYNES,
MATTHEW POLLOCK.